US012762576B2

(12) United States Patent
Shleifer et al.

(10) Patent No.: US 12,762,576 B2
(45) Date of Patent: Oct. 13, 2026

(54) SYSTEMS AND METHODS FOR GENERATING ACTIONABLE REGULATORY INSIGHTS FOR PREDICTIVE ANALYTICS

(71) Applicant: RegASK Pte. Ltd., Singapore (SG)

(72) Inventors: Caroline Shleifer, Singapore (SG); Amenallah Reghimi, Singapore (SG)

(73) Assignee: RegASK Pte. Ltd., Singapore (SG)

( * ) Notice: Subject to any disclaimer, the term of this patent is extended or adjusted under 35 U.S.C. 154(b) by 0 days.

(21) Appl. No.: 19/005,134

(22) Filed: Dec. 30, 2024

(65) Prior Publication Data

US 2026/0187651 A1 Jul. 2, 2026

(51) Int. Cl.

| | |
|---|---|
| ***G06Q 30/018*** | (2023.01) |
| ***G06F 16/953*** | (2019.01) |
| ***G06F 18/241*** | (2023.01) |

(52) U.S. Cl.

CPC ......... *G06Q 30/018* (2013.01); *G06F 16/953* (2019.01); *G06F 18/241* (2023.01)

(58) Field of Classification Search

None

See application file for complete search history.

(56) References Cited

U.S. PATENT DOCUMENTS

2024/0403341 A1* 12/2024 Berglund ............ G06F 16/3326
2025/0191082 A1* 6/2025 Kumar .................. G06Q 50/02

* cited by examiner

*Primary Examiner* — George Chen

(74) *Attorney, Agent, or Firm* — Carr & Ferrell LLP; Myrna M. Schelling

(57) ABSTRACT

Systems and methods for generating actionable regulatory insights for predictive analytics are disclosed. A method comprises receiving, by an artificial intelligence (AI) model, a regulatory query from a client device. A determination is made whether the query requires new data retrieval or if existing data can answer the query. When the query requires new data retrieval, a Web search is activated, which includes prompting an external large language model (LLM) to provide a regulatory document that answers the regulatory query. The regulatory document is retrieved in answer to the regulatory query. The answer to the query is transmitted to the client computing device. The generated answer, regulatory content, and the regulatory documents are provided in a feedback loop to the AI model, to improve training data. The client computing device is provided an actionable regulatory insight, including a recommended workflow of tasks based on the recommendation regarding the regulatory content.

13 Claims, 9 Drawing Sheets

FIG. 6
REGASK
You
What are the registration requirements for food supplements in the UK? Provide links to references.
RegGenius
Answer 1: According to the information provided, there are no specific product registration requirements for food supplements in the UK. However, the following points are relevant...
RegGenius

600

SYSTEMS AND METHODS FOR GENERATING ACTIONABLE REGULATORY INSIGHTS FOR PREDICTIVE ANALYTICS

CROSS REFERENCE TO RELATED APPLICATIONS

Not applicable.

FIELD OF THE INVENTION

The disclosed teachings relate to techniques for generating actionable regulatory insights for predictive analytics. The disclosed teachings more particularly relate to techniques for providing predictive analytics to a given organization, by generating actionable regulatory insights and workflows that are customized for the organization, utilizing a generative artificial intelligence (GEN-AI) agent and prompting an external large language model (LLM), and with the assistance of machine learning techniques and an artificial intelligence platform.

BACKGROUND

Organizations, including for-profit businesses, are expected to comply in a timely fashion with a multitude of laws, policies and procedures, regulations, guidelines, standards, and the like, as mandated by governmental agencies, standardization bodies, and other governing bodies. This compliance by organizations is often referred to as regulatory compliance. If an organization meets its regulatory obligations, then customers and stakeholders are more likely to view the organization as being trustworthy, ethical, and operating with high integrity within the laws and regulations that govern the organization. On the other hand, if an organization does not comply with the laws and regulations that govern it, then the organization will likely face hefty fines, it may lose its operating licenses, and it may even be shut down by a governmental agency, standardization body, or other governing body. Furthermore, if an organization is non-compliant with the laws and regulations that govern it, such non-compliance will result in the tarnishing of the organization's reputation with its customers and stakeholders. Ultimately, the organization may even lose its customers and stakeholders, which is detrimental to the survival of the organization.

SUMMARY

According to some embodiments, the present disclosure is directed to an example method for generating actionable regulatory insights for predictive analytics. The method comprise: receiving, by an artificial intelligence (AI) model, a regulatory query from a client computing device associated with an organization, the regulatory query comprising a question related to a regulation that is relevant to an industry of the organization, the AI model having training data and a hierarchy of classifications, the AI model further comprising a generative AI (GEN-AI) agent, the AI model utilizing vertical AI and retrieval augmentation generation techniques, the GEN-AI agent having an ontology classifier to categorize data in a classification within the hierarchy of classifications of the AI model; determining, by the AI model, whether the regulatory query requires new data retrieval from a Web search or if existing internal data accessible to the AI model can answer the regulatory query; when the regulatory query requires new data retrieval, activating a Web search, via the GEN-AI agent, the Web search activation comprising prompting an external large language model (LLM) to provide a regulatory document that answers the regulatory query; retrieving, by the AI model, a regulatory document in answer to the regulatory query, from at least one of the existing internal data and the external LLM; based on the retrieved regulatory document, generating, by the AI model, an answer to the regulatory query and verifying alignment of the generated answer with the regulatory query; transmitting the generated answer to the client computing device, the generated answer including regulatory content from the retrieved regulatory document and a reference or a web link to the retrieved regulatory document, the generated answer further providing a recommendation regarding the regulatory content; providing the generated answer, regulatory content and the retrieved regulatory documents in a feedback loop to the AI model, for improving the training data of the AI model; categorizing, by the ontology classifier, the generated answer, regulatory content, and the retrieved regulatory documents in one or more classifications within the hierarchy of classifications of the AI model; and generating and providing the client an actionable regulatory insight for predictive analytics, the actionable regulatory insight including a recommended workflow of tasks based on the recommendation regarding the regulatory content.

According to some embodiments, the present disclosure is directed to a system for generating actionable regulatory insights for predictive analytics. The example system comprises a memory and a processor communicatively coupled to the memory, the memory storing instructions executable by the processor to: receive, by an artificial intelligence (AI) model of the regulatory intelligence controller, a regulatory query from a client computing device associated with an organization, the regulatory query comprising a question related to a regulation that is relevant to an industry of the organization, the AI model having training data and a hierarchy of classifications, the AI model further comprising a generative AI (GEN-AI) agent, the AI model utilizing vertical AI and retrieval augmentation generation (RAG) techniques, the GEN-AI agent having an ontology classifier to categorize data in a classification within the hierarchy of classifications of the AI model; determine by the AI model, whether the regulatory query requires new data retrieval from a Web search or if existing internal data accessible to the AI model can answer the regulatory query; when the regulatory query requires new data retrieval, activate a Web search, via the GEN-AI agent, the Web search activation comprising prompting an external large language model (LLM) to provide a regulatory document that answers the regulatory query; retrieve, by the AI model, a regulatory document in answer to the regulatory query, from at least one of the existing internal data and the external LLM; based on the retrieved regulatory document, generate, by the AI model, an answer to the regulatory query and verify alignment of the generated answer with the regulatory query; transmit the generated answer to the client computing device, the generated answer including regulatory content from the retrieved regulatory document and a reference or a web link to the retrieved regulatory document, the generated answer further providing a recommendation regarding the regulatory content; provide the generated answer, regulatory content and the retrieved regulatory documents in a feedback loop to the AI model, for improving the training data of the AI model; categorize, by the ontology classifier, the generated answer, regulatory content, and the retrieved regulatory documents in one or more classifications within the hierarchy of classifications of the AI model; and generate and provide the client an actionable regulatory insight for predictive analytics, the actionable regulatory insight including a recommended workflow of tasks based on the recommendation regarding the regulatory content.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION OF EMBODIMENTS

Overview

Organizations, including for-profit businesses, are required to accomplish an almost insurmountable task by determining which of the thousands of regulatory rules, policies and procedures, guidelines, standards and the like (hereinafter collectively referred to as "regulations") apply to them. Further, even if they could determine what regulations apply to them, such organizations often fail in their duty to implement what is required to comply with the applicable regulations. Organizations often do not have the knowledge or the know-how to accomplish actionable items in order to meet their mandated regulatory obligations. The present disclosure solves these issues and more by providing systems and methods for generating actionable regulatory insights for predictive analytics.

Specifically, the present disclosure provides an AI-driven integrated end-to-end modular solution that empowers organizations to navigate complex regulatory landscapes, by providing continuous monitoring of regulatory content, practical and actionable industry-level insights, expert guidance, and AI-driven solutions. The systems and methods described herein help organizations to stay current with the latest regulatory changes in their industries through curated alerts and AI-driven deep insights that are augmented with expert knowledge and custom-tailored to an organization's own data collection and context. Further, through a generative AI (GEN-AI) conversational module that will be described in greater detail later herein, a customer, a client, or a user (such as an organization's team member) of the system can ask regulatory questions and obtain answers to those questions in real time. Also, the present disclosure generates tailored, timely actionable insights for predictive analytics and proactive risk identification.

Exemplary systems provided herein are modular in design, with each system module being configured to easily integrate and communicate with each other. Further, the present disclosure provides step-by-step actionable regulatory recommendations to an organization through a workflow orchestration module, so that the organization's team members can be assigned easy-to-understand tasks to implement the regulatory recommendations and help the organization to comply with the applicable regulations.

EXAMPLE EMBODIMENTS

Figure 1A:
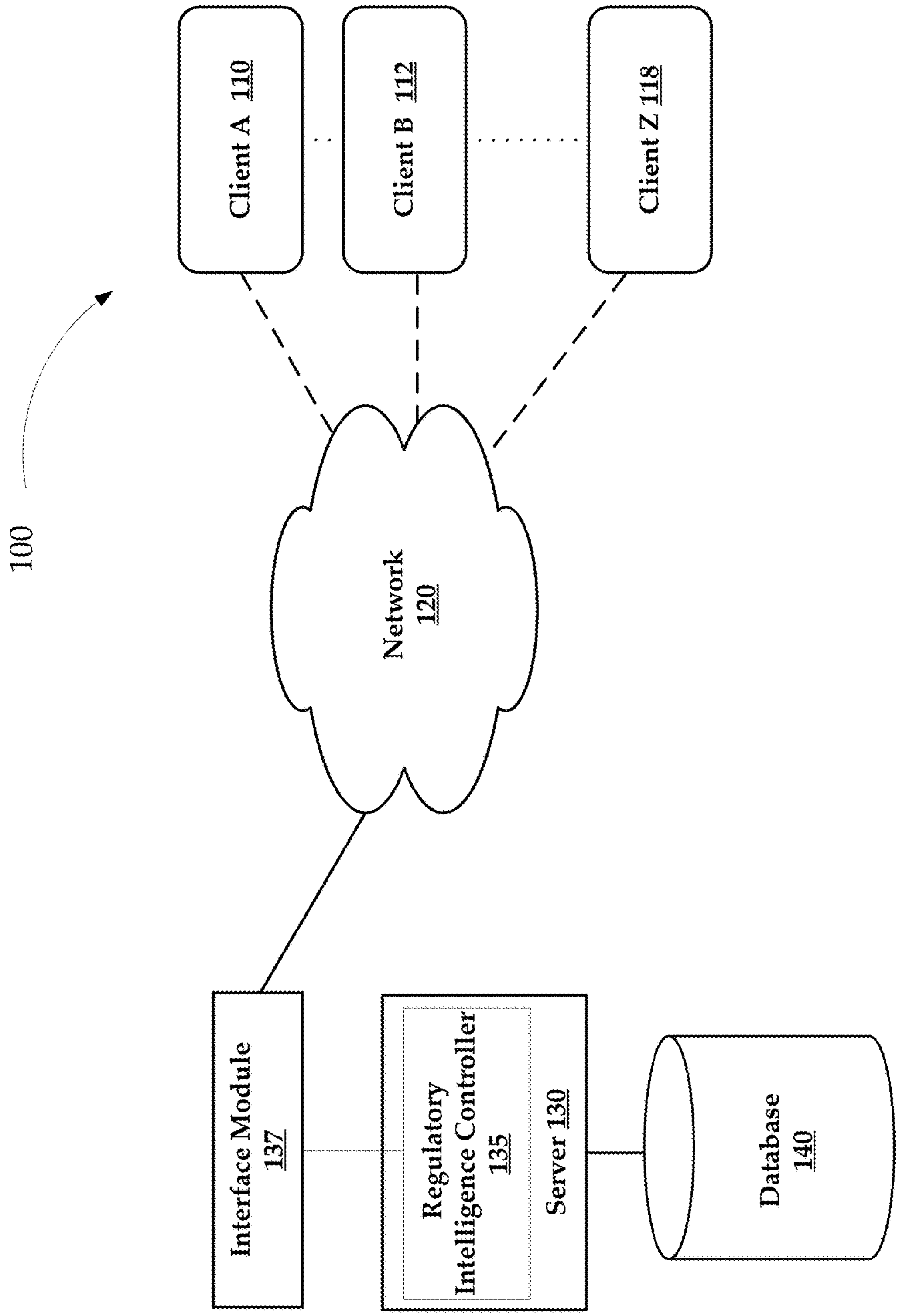
FIGS. 1A, 1B, and 1C depict illustrative architectures in which exemplary techniques and structures for providing the systems and methods disclosed herein may be implemented.

FIG. 1A is a block diagram of an exemplary networking system 100 in accordance with embodiments of the present invention. The networking system 100 includes clients A 110, B 112, and so forth through client Z 118 (additional or fewer clients may be implemented), a network 120, a server 130 with a regulatory intelligence controller 135 and an interface module 137, and a database 140. As with all of the figures provided herein, one skilled in the art will recognize that any number of elements 110-140 can be present in the networking system 100 and that the exemplary methods described herein can be executed by one or more of elements 110-140. Any number of any of elements 110-140 can be present in the networking system 100, and the networking system 100 is configured to serve these elements. For example, the server 130 may transmit data via the network 120 to clients 110-118, despite the fact that only three clients are shown in FIG. 1A. For all figures mentioned herein, like numbered elements refer to like elements throughout. One skilled in the art can appreciate that in certain embodiments, distributed computing is utilized in the networking system 100.

Clients 110-118 may be implemented as computers having a processor that runs software stored in memory, wherein the software may include network browser applications (not shown) configured to render content pages, such as web pages, from the server 130. Clients 110-118 can be any computing device, including but not limited to mobile devices, smartphones, wearables, handheld devices, display devices, smart watches, tablets, augmented reality (AR) computing devices, virtual reality (VR) computing devices, AR or VR headsets, digital assistants (PDAs), portable computers, laptop computers, and desktop computers. The clients 110-118 may communicate with a web service provided by the server 130 over the network 120. Additionally, the clients 110-118 may be configured to store an executable application that encompasses one or more functionalities provided by the regulatory intelligence controller 135.

The network 120 can be any type of network, including but not limited to the Internet, LAN, WAN, a telephone network, and any other communication network that allows access to data, as well as any combination of these. The network 120 may be coupled to any of the clients 110-118, the interface module 137, and/or the server 130. As with all the figures provided herewith, the networking system 100 is exemplary and not limited to what is shown in FIG. 1A.

The server 130 can communicate with the network 120 and the database 140. It will be apparent to one skilled in the art that the embodiments of this invention are not limited to any particular type of server and/or database. For example, the server 130 may include one or more application servers, one or more web servers, or a combination of such servers. In some embodiments, the servers mentioned herein are configured to control and route information via the network

120 or any other networks (additional networks not shown in FIG. 1A). The servers herein may access, retrieve, store and otherwise process data stored on any of the databases mentioned herein.

An interface module 137 may be implemented as a machine separate from server 130 or as hardware, software, or combination of hardware and software implemented on server 130. In some embodiments, the interface module 137 may relay communications between the regulatory intelligence controller 135 and the network 120. The interface module 137 may also relay communications between the regulatory intelligence controller 135 and the clients 110-118 via the network 120.

The database 140 can be configured to include a context of one or more users or customers. A "context" as used herein is defined as a combination of a customer's specific monitoring scope and the custom content they upload to the server (such as server 130) of this regulatory tracking platform. The phrase "customer scope" refers to the industry and geographic areas the customer wishes to track. For instance, if a customer operates in the cosmetics industry and focuses on compliance in the USA, Canada, Singapore, and Japan, their monitoring scope would be limited to that one (1) industry and those four (4) countries. The phrase "uploaded Content" refers to custom content that a customer uploads to the system, such as internal documents, workflows, and task plans, which enrich the context. These documents can include internal policies, product-specific requirements, or compliance workflows. By integrating this scope and content, the system platform personalizes its operations. All alerts, insights, and workflow automations are tailored to this specific context, ensuring actionable intelligence and recommendations that align precisely with the customer's needs. This framework guarantees that the customer receives insights and solutions that are relevant to their unique operational environment.

The database 140 can also be configured to store one or more documents, as well as any other type of information including one or more tables of data, all of which may be accessible to the regulatory intelligence controller 135. In a non-exhaustive list, the documents can include regulatory documents, documents or web pages that are downloaded from the Web, documents uploaded by one or more clients 110-118, organizational charts uploaded by the one or more clients 110-118, documents verified or graded by an artificial intelligence model or subject matter experts, and the like. The one or more tables of data may include tables that track user permissions, such that the system may only be accessed by those users who have been granted permission. Information regarding documents may also be stored in the database 140. Such information may be regarding any aspect of a document, including but not limited to classifications (which will be described later herein), metadata associated with a document, the author(s) of a document, the source(s) of a document, information of where the document is currently being physically stored in the organization (such as an office location, a disk drive location, or a name of custodian of the document), tagging or any other type of analysis of a document (whether it was done through human-only review or by automated machine learning), and predictive analytics related to the document. Such predictive analytics related to one or more documents are discussed later herein in greater detail.

It should be noted that machine learning (ML) plays a foundational role in enabling the systems and methods of the present disclosure to deliver tailored, accurate, and actionable regulatory intelligence. The key applications include:

Regulatory Relevance Determination Using an Ontology Classifier (RegASK Reg-Ontology):

A ML model has been developed to determine the regulatory relevance of documents, updates, and tasks. By leveraging an ontology classifier (which is described later herein), which is a proprietary taxonomy of regulatory terms, relationships, and concepts, the system classifies, ranks, and prioritizes regulatory updates based on their significance to a customer's specific context.

Content Categorization:

ML algorithms categorize uploaded documents and regulatory updates by tagging them with appropriate metadata, such as topics, industries, and jurisdictions, ensuring precise filtering for the customer's context.

Insight Generation:

Using ML, the system analyzes historical data to predict trends and generate recommendations. For example, it can identify emerging compliance risks or suggest proactive measures for mitigating potential regulatory issues.

Alert Prioritization:

The system uses ML models to prioritize regulatory alerts in real-time based on their urgency and relevance to the customer's scope, enabling immediate action on critical updates.

Natural Language Processing (NLP):

Advanced NLP extracts key insights, summaries, and actionable points from lengthy regulatory texts, reducing the manual burden for customers.

Anomaly Detection in Compliance:

The system uses ML to identify potential compliance gaps or inconsistencies by comparing historical adherence data with current regulations, flagging deviations for review.

Workflow Optimization:

The system leverages ML to recommend optimal task allocations and timelines, ensuring that compliance workflows are efficient and aligned with operational deadlines.

Continuous Learning and Personalization:

Feedback from customers and new regulatory data continuously refine the ML algorithms, allowing the system platform to evolve and adapt to the changing needs of customers.

By combining the ontology classifier with advanced ML models, the system ensures relevance, accuracy, and scalability, delivering a highly effective regulatory compliance solution.

Returning to FIG. 1A, the clients 110-118 may interface with the regulatory intelligence controller 135 on server 130 via the network 120 and the interface module 137. The regulatory intelligence controller 135 may receive requests and/or data from the clients 110-118. The clients 110-118 may provide data for storage in the database 140, and therefore may be in communication with the database 140. Likewise, the regulatory intelligence controller 135 may access the database 140 based on one or more requests or inquiries received from the clients 110-118. Further details as to the data communicated in the networking system 100 are described more fully herein.

Figure 1B:
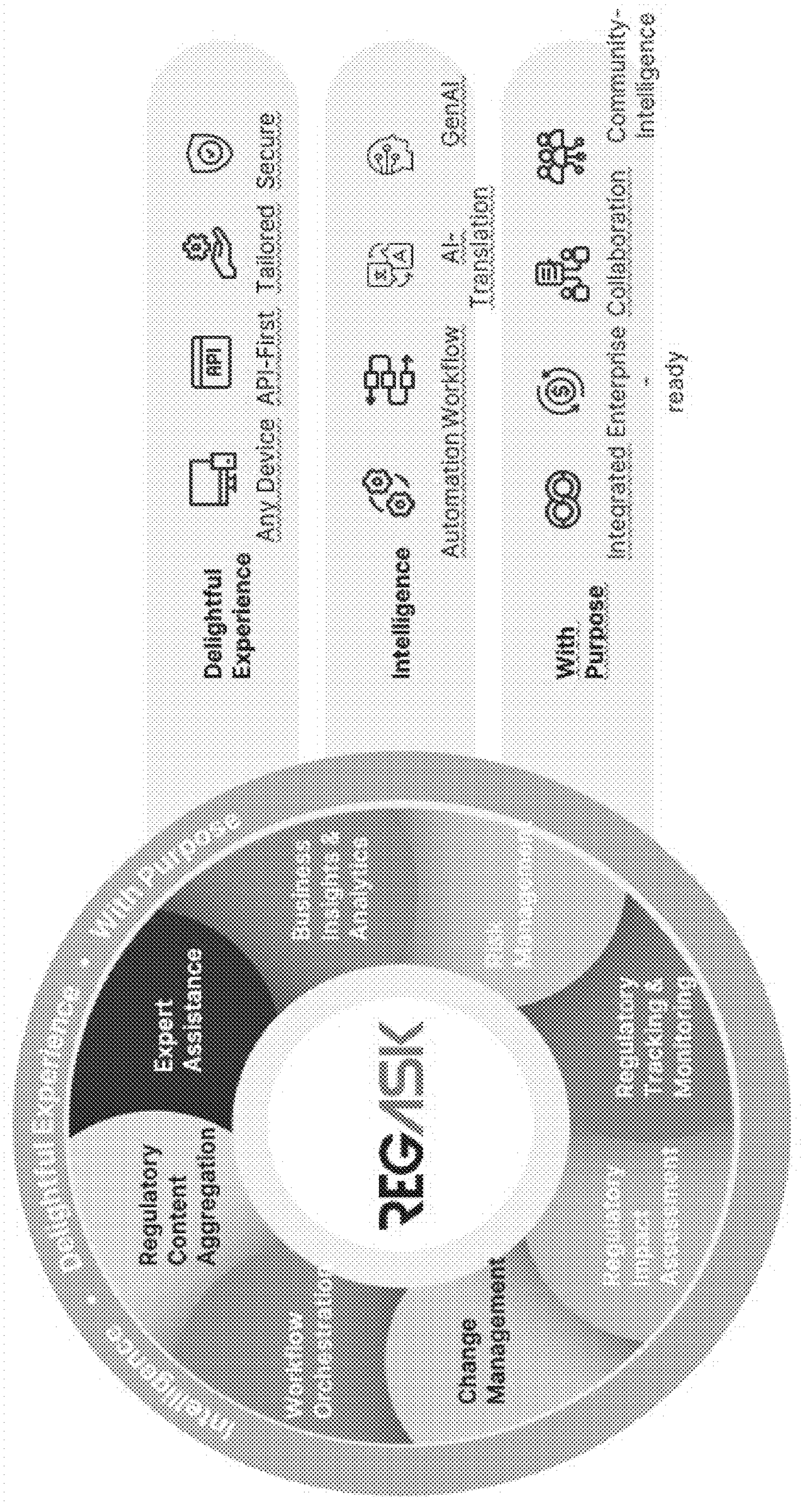

FIG. 1B depicts a functional architecture of an exemplary system in accordance with embodiments of the present invention, from a business value perspective. It will be appreciated by one skilled in the art that the exemplary system of FIG. 1B can be implemented in or in conjunction with the networking system 100 of FIG. 1A.

As shown in FIG. 1B, the system provides aspects of regulatory content aggregation, expert assistance, business insights and analytics, risk management, regulatory tracking and monitoring, regulatory impact assessment, change management, and workflow orchestration. All of these aspects will be described in greater detail later herein. Furthermore, the system as depicted in FIG. 1B can be experienced using any device by the organization (also known as a customer) or any type of user of the system platform (such as a team member or personnel of the organization. Further, the system is API-first, meaning that the system prioritizes APIs and focuses on their value to a business or organization. The system can also utilize the APIs of the organization. Further, the system's intelligence is exemplified by the aspects of automation, workflow, its AI-translation capabilities, and GEN-AI conversational capabilities. Finally, the system has a purpose. It is an integrated solution that is enterprise-ready, it is suited for and enhances collaboration, and it utilizes community intelligence (e.g., by way of a community of subject matter experts).

Figure 1C:
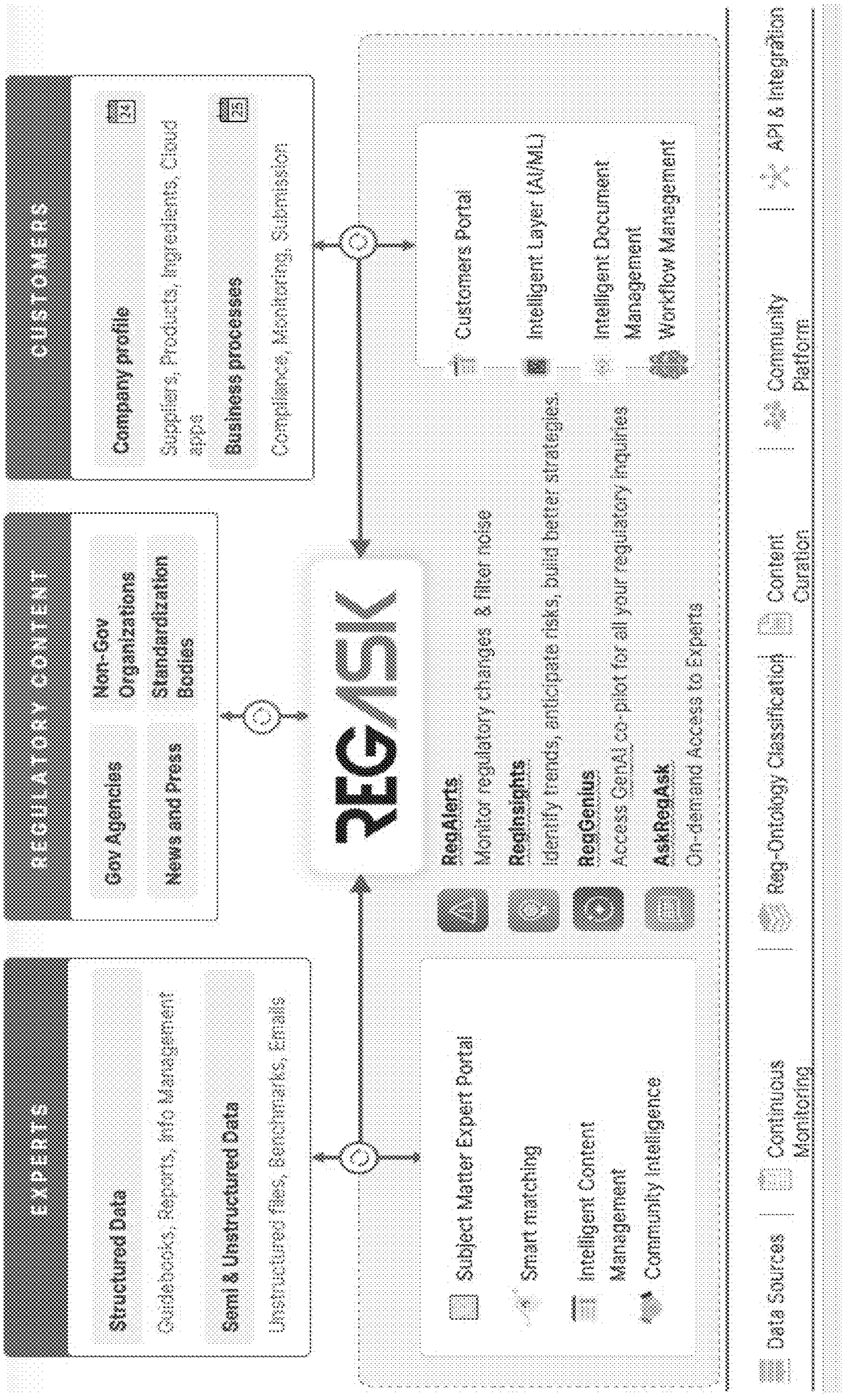

Turning to FIG. 1C, FIG. 1C shows yet another exemplary architecture of a system in accordance with certain embodiments of the present disclosure. FIG. 1C shows a system that can interact with both experts and customers (such as organizations or companies). FIG. 1C also shows that the system (which is known as the RegASK platform) has four components, namely, RegAlerts, RegInsights, RegGenius, and Ask RegASK. Each of these four components will be described in greater detail later herein. Finally, it is important to note that the system depicted in FIG. 1C relies on ontology classification. A much more in-depth discussion regarding ontology classification will be given later, but it is important to note that the ontology classifier of the system and the AI-driven automation of this system work synergistically to provide the appropriate, timely regulatory content to a customer's request for regulatory information. This in turn leads to content creation (by artificial intelligence), predictive analytics and trends.

Figure 2:
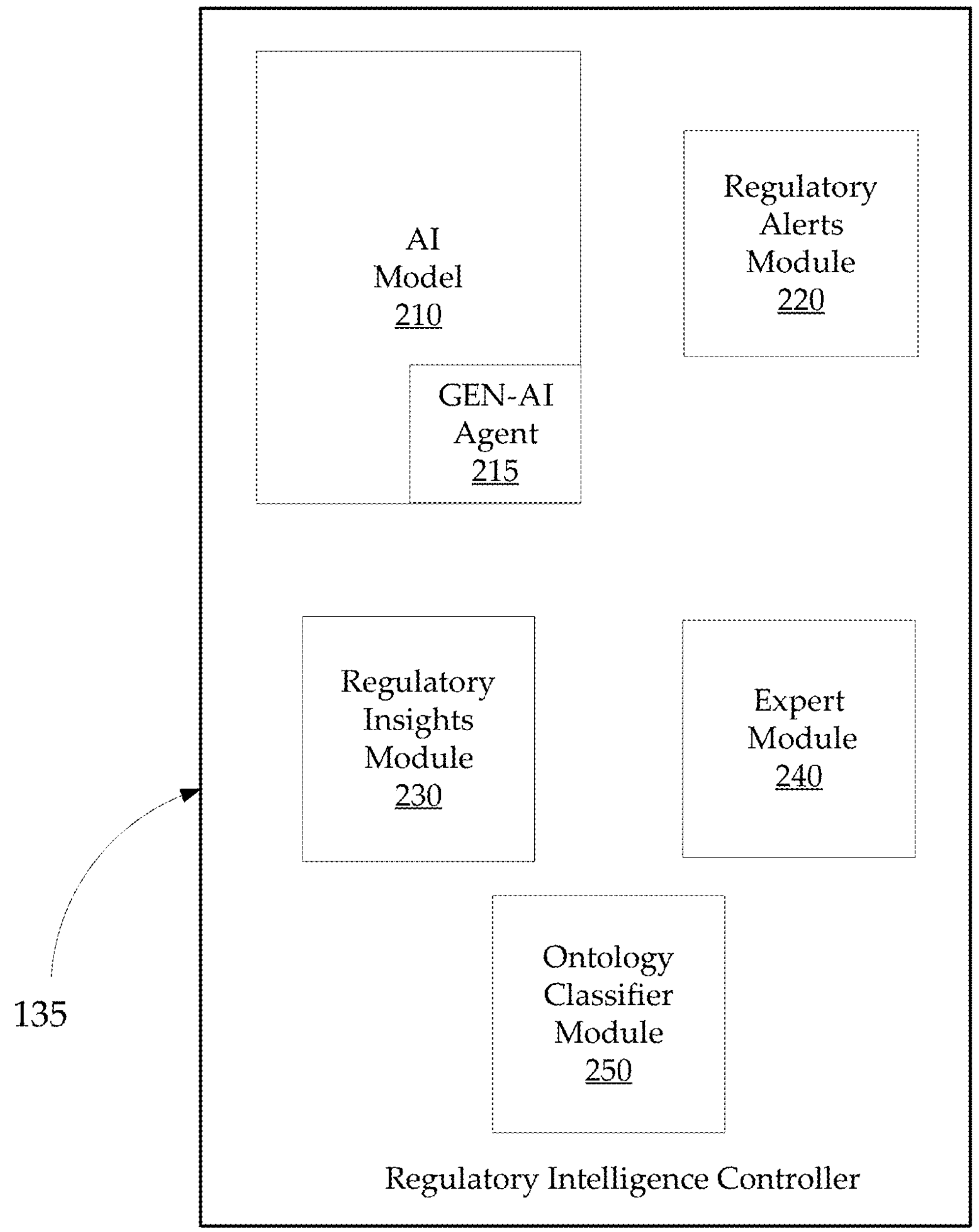
FIG. 2 depicts an exemplary regulatory intelligence controller, in accordance with certain embodiments disclosed herein.

FIG. 2 is a block diagram of an exemplary architecture of the regulatory intelligence controller 135 of the networking system 100 of FIG. 1A. The regulatory intelligence controller 135 may include one or more modules for performing one or more methods as described herein. According to various embodiments of the present technology, the regulatory intelligence controller 135 includes an artificial intelligence (AI) module 210 with a generative artificial intelligence (GEN-AI) agent 215 (implementing the RegGenius™ component of the exemplary system in FIG. 1C), a regulatory alerts module 220 (implementing the RegAlerts®) component of the exemplary system in FIG. 1C), a regulatory insights module 230 (implementing the RegInsights® component of the exemplary system in FIG. 1C), and an expert module 240 (implementing the Ask RegASK™ component of the exemplary system in FIG. 1C). Each of the modules 210-240 may communicate with one another. Although various modules may be configured to perform some or all of the various steps described herein, fewer or more modules may be provided and still fall within the scope of various embodiments.

An example regulatory intelligence controller (such as the regulatory intelligence controller 135 of FIG. 1A) can be implemented by way of an application that is downloaded onto the computing device or that can be accessed by way of an API call. In another embodiment the regulatory intelligence controller can be integrated as a feature inside a web browser, a reader application, or alternatively, the controller can be implemented by way of an application that is part of an operating system of a computing device associated with a customer or user.

Returning to FIG. 2, the artificial intelligence (AI) model 210 of the regulatory intelligence controller 135 is responsible for transforming regulatory intelligence with agentic and vertical artificial intelligence, as part of one or more exemplary methods described herein. The AI model 210 can be seen as an organization's AI co-pilot for obtaining instant regulatory insights. The AI model 210 has a multitude of capabilities. The AI model 210 provides a platform for instant regulatory responses, augmented analytics for deeper insights, content summarization for swift information processing, and AI-driven translations to bridge language barriers. Additionally, the AI model 210 provides smart recommendations on regulatory impacts impacts, ensuring that businesses are always ahead of regulatory change.

For instance, the AI model 210 can perform translations of documents including regulatory content. The AI model 210 can also deliver tailored and actionable regulatory information, enabling organizations to boost productivity, compliance, and strategic decision-making.

The AI model 210 generates and provides augmented analytics. Specifically, it obtains deep insights into regulatory data and trends using its artificial intelligence and it works with the regulatory insights module 230 to provide those deep insights to a user or organization in a data-rich trending topics dashboard, which will be described later herein. Specifically, the AI model 210 provides augmented and predictive analytics, as well as insights, all of which maximize the value of organizations' existing data and simplify stakeholder reporting.

The AI model 210 also creates guided alerts for an organization by collaborating with the regulatory alerts module 220. In other words, the AI model 210 automatically digests and summarizes regulatory news, and then provides these summaries to an organization in alerts that are generated using the regulatory alerts module 220. Using artificial intelligence, the AI model 210 provides actionable insights for organizations on recommended next steps to implement so as to comply with updated or current regulations applicable to the organization. The AI model 210 in conjunction with the regulatory alerts module 220 can offer smart recommendations on business impact. More details about recommendations and insights are provided later herein.

Also, as mentioned earlier herein, the AI model 210 has an automatic AI capability that translates regulatory documents from a foreign language to the user's preferred language. The AI model 210 also offers smart recommendations on business impact and translates the results into the user's preferred language.

Notably, in certain embodiments, the AI model 210 comprises a GEN-AI conversational agent or module (also referred to as the GEN-AI agent) 215. The GEN-AI agent 215 allows a user to ask regulatory questions or inquiries, in the form of prompts to the AI model or large language model (LLM) such as ChatGPT. Then, the LLM will generate answers to the user's regulatory question and provide its answers to the user through the GEN-AI agent 215. Hence, the GEN-AI agent 215 obtains immediate, real-time responses to specific regulatory questions, reducing the time it takes for a user to research specific requirements.

Figure 3:
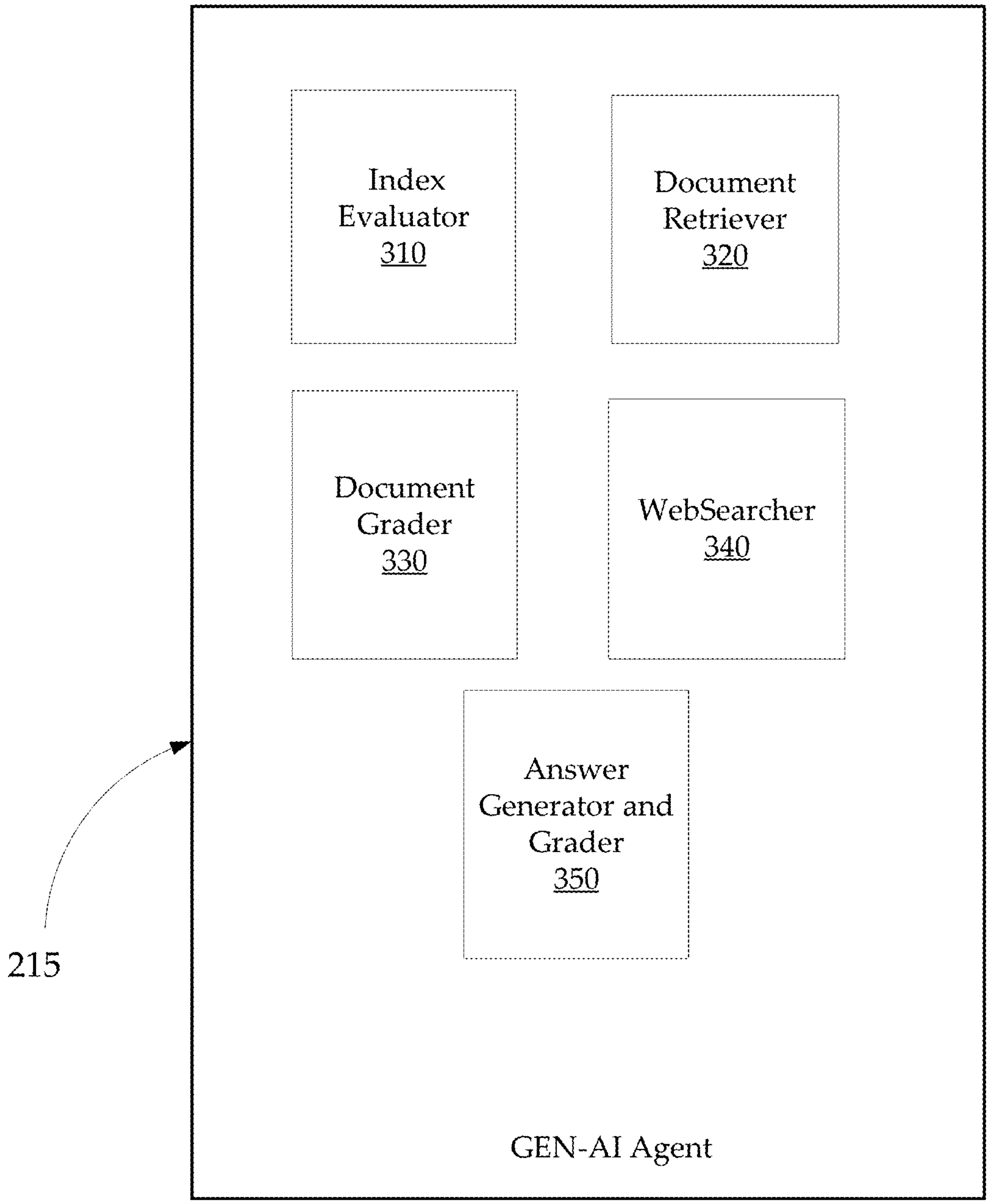
FIG. 3 depicts a plurality of specialized agents of an exemplary generative artificial intelligence (GEN-AI) agent, in accordance with certain embodiments disclosed herein.

The GEN-AI agent 215 comprises multiple specialized agents, as shown in FIG. 3, with vertical expertise. With the vertical AI and expertise, the GEN-AI agent 215 is trained with regulatory expertise, such that it solves a problem in the way that the customer or organization desires. In exemplary embodiments, the GEN-AI agent 215 is independent from third-party LLMs (large language models) or even new LLMs. The GEN-AI agent 215 can utilize a customer or an organization's LLM with a click of a button on the platform. The exemplary system is built on the server side, not on the client (or customer) side. That is, the exemplary system does not rely upon the clients or multiple vendors. Instead, as mentioned earlier, the GEN-AI agent 215 uses multiple specialized agents, rather than just one agent with an API call. Hence, the GEN-AI agent 215 comprises multiple workflows, with specialized and vertical agents that understand the customer or organization's context.

Using the GEN-AI agent 215, a user can ask in real time, typically through a prompt, their regulatory query, question or inquiry to the third-party AI model or LLM. Upon receiving the user's regulatory question, the GEN-AI agent 215 of the AI model 210 will search through all the internal data that the system has, including the data of the server 130 and the database 140 (FIG. 1A). In some embodiments, the GEN-AI agent 215 will also search through the data uploaded by the user or organization, including but not limited to, the data of a LLM belonging to the user or organization. Then, depending on whether the GEN-AI agent 215 located any data that answers the user's regulatory question, the GEN-AI agent 215 may search online, either with or without the help of the third-party AI model or LLM. That is, the GEN-AI agent 215 may conduct its own Internet searches online, or it may ask the third-party AI model or LLM to provide an answer to the user's regulatory question. The GEN-AI agent 215 will also refer to the user or organization's content and regulatory classification, and then bring all this data together to provide the user with an answer to their regulatory question. Using the trust and verify principle, the answer that is generated by the GEN-AI agent 215 will provide all the references to the original source regulatory documents, so that the user can verify that the accuracy of the response provided by the GEN-AI agent 215. Further details of the GEN-AI agent 215 are provided in the foregoing description of FIG. 3.

Furthermore, it should be noted that the systems or platforms disclosed herein can be built on top of a Retrieval Augmented Generation (RAG) architecture. In other words, the systems that are described in the present disclosure are built using a software architecture that combines LLMs (either private LLMs or third-party LLMs) with business-specific information sources to improve the accuracy and relevance of responses that are obtained by the LLM. As an example, the GEN-AI agent 215 can use a third-party AI model or LLM (such as ChatGPT) to answer a regulatory question posed by a user. Then, the GEN-AI agent 215 can search online itself for the answer to the user's regulatory question. Or, the GEN-AI agent 215 can query on the organization or user's data or documents and their context. Alternatively, in some embodiments, a user or an organization may upload one or more documents to the system, and indicate to the AI model that they only want the GEN-AI agent 215 to obtain regulatory documents or information based on searches of only their own data collection or their own private LLM.

Furthermore, once the third-party or external AI model or LLM provides a response to the user's regulatory question, the GEN-AI agent 215 can ask the third-party AI model or LLM some follow-up questions. In other words, the GEN-AI agent 215 can leverage the generative aspect of the third-party AI model or LLM to check the veracity of its response to the user's regulatory question and to reduce the chances of a hallucination.

First, the GEN-AI agent 215 can ask the follow-up question about how one can verify that the response provided by the third-party AI model or LLM was accurate and optimal. Also, the GEN-AI agent 215 can ask the follow-up question for the third-party AI model or LLM to provide its recommendations and what are the top ways to implement those recommendations. Once the third-party AI model or LLM provides the top ways to implement its recommendations for regulatory compliance, then the GEN-AI agent can ask the third-party AI model or LLM to perform those ways (e.g., 10 ways) in parallel and provide the outcomes, so that the user can provide some certainty based on a given threshold that those top ways are optimal. Based on its testing, the third-party AI model or LLM can then provide the top 3 ways to implement its recommendations, based on optimization. In other words, the third-party AI model can prompt the external LLM to provide a plurality of recommended tasks to be implemented for regulatory compliance based on the retrieved documents; request the external LLM to test its plurality of recommended tasks in parallel; request the external LLM to prioritize its plurality of recommended tasks in order based on optimization; and obtain the plurality of recommended tasks and prioritization from the external LLM.

Still referring to FIG. 2, the regulatory alerts module 220 is tasked with monitoring regulatory changes and filtering noise using artificial intelligence. Further, the regulatory alerts module 220 features automated monitoring and workflow integration. In other words, the regulatory alerts module 220 proactively monitors and tracks changes in regulations specific to the organization's business scope.

The regulatory alerts module 220 generates and delivers customized alerts, summarizes regulatory updates, and utilizes impact analysis to identify potential compliance risks for the organization. The regulatory alerts module 220 does this by setting up keyword monitoring alerts based on the organization's context, to ensure that only relevant alerts are sent to the client, cutting through the noise and ensuring that the organization is focused on only the relevant regulatory regulations applicable to the organization and its industry. In some embodiments, the regulatory alerts module 220 provides the alerts to the organization (e.g., clients 110-118 of FIG. 1A) through the interface module 137 of FIG. 1A. In further embodiments, the regulatory alerts module 220 provides the alerts to the organization (e.g., clients 110-118 of FIG. 1A) visually on a dashboard generated by the system, or through emails and/or text messages.

Further, in other embodiments, the regulatory alerts module 220 can obtain information from a network of vetted experts to set up keyword monitoring alerts or verify the accuracy of the keyword monitoring alerts, so that only relevant regulatory regulations are provided to the organization. An alert generated by the regulatory alerts module 220 also includes a reference or a link to the original source of information, so that a user or an organization can directly access the original source of data, information or regulatory document, in order to obtain more information about the regulatory content or the update made to the regulatory content, which the regulatory alerts module 220 identified.

The regulatory alerts module 220 also provides an impact assessment capability that empowers users with deeper insights into how regulatory and compliance updates affect their industry. This enhancement offers detailed analysis to understand the potential effects of new regulations on operations, with access to an "Impact Assessment" section when reviewing the details of an alert that is generated by the regulatory alerts module 220. The regulatory alerts module 220 comprises a workflow orchestration module that generates actionable next steps to a user, providing clear recommendations on actions to take, in order to strategize regulatory compliance and risk mitigation efforts. In some embodiments, the workflow orchestration module generates the actionable next steps based on the data previously provided or uploaded by the organization. Such data includes, but is not limited to, documents, organizational structure or organizational charts, personnel information, regulatory compliance documents, and the like. The workflow orchestration module can also generate the actionable next steps by collaborating with the GEN-AI agent 215 of the AI model 210, to prompt a third-party external LLM (such as ChatGPT) to provide actionable next steps or recommendations based on the regulatory content that was the substance of the alert at issue. In other embodiments, the workflow orchestration module can generate the actionable next steps using machine learning and artificial intelligence to prompt the customer's own private LLM, to provide actionable next steps or recommendations based on the regulatory content that was the substance of the alert at issue. Thus, this impact assessment feature fosters informed decisions, proactive compliance, and efficient processes, simplifying the regulatory response with structured guidance to a user, by providing a roadmap to a user on how to implement the recommendations for effective compliance management. Further, automated rules can be generated, so that if a new regulation or regulation update includes a keyword (either a keyword that is identified by the organization or a repeated keyword identified by the AI model 210), the AI model 210 will create a workflow of tasks based on the new regulation or updated regulation, and will provide the workflow of tasks to the organization's team members, via email notifications.

Further, the regulatory alerts module 220 can include a task management feature, which can serve as a dynamic checklist, allowing an organization to assign actionable tasks to team members seamlessly. This feature empowers the organization to oversee and track alert assignments from a centralized dashboard, delegate responsibilities with established timelines, and facilitate seamless teamwork through interactive comments and instant alerts. The task management feature allows users to create a hierarchical structure where a parent task is assigned to address a specific regulatory alert or update that was identified by the regulatory alerts module 220. Also, multiple sub tasks can be created and assigned to different team members of the organization. Thus, when a regulatory alert or update is identified by the regulatory alerts module 220, a parent task is created to encompass the necessary actions required to address it. This parent task serves as an overarching framework that outlines the scope of work and the overall objectives. Under the parent task, a user can create multiple sub tasks, each assigned to a specific team member. The user can enter a task title, description, team member and due date for completion. These sub tasks represent individual components or responsibilities within the larger regulatory compliance initiative.

By breaking down the work into manageable sub tasks, organizations can ensure that all aspects of the regulatory update are addressed efficiently. Hence, by assigning sub tasks to different team members, organizations can foster collaboration and encourage team members to work together to achieve the overall objectives. The regulatory alerts module 220 also generates a centralized task hub or dashboard, so that a user or organization can seamlessly oversee and track alert assignments using the dashboard in real-time. Also, the regulatory alerts module 220 can generate an audit log, so that an organization can see which team member accomplished a given task or subtask or reviewed a regulatory document.

Turning to the regulatory insights module 230, the regulatory insights module 230 identifies trends, anticipates risks, and builds better strategies for an organization. In certain embodiments, the regulatory insights module 230 generates reports and analytics. Specifically, the regulatory insights module 230 provides the organization with a deeper understanding of possible future or emerging regulatory trends that may impact them, allowing them to anticipate regulatory risks and unlock the potential of new business opportunities. In some embodiments, the regulatory insights module 230 detects early signals of potential regulatory changes and key market trends to drive an organization's strategies and lower its business risks. The regulatory insights module 230 utilizes artificial intelligence to deliver curated insights globally to the organization.

The regulatory insights module 230 utilizes horizon scanning methodology to generate reports and analytics. The regulatory insights module 230 allows a user to explore the interactive global map for the latest published regulations in their environment and gain insights into their current scope, upcoming task datelines, trending topics and key metrics. Using the horizon scanning methodology, the regulatory insights module 230 scans multiple websites and channels to detect early signals of potential regulatory developments and identify emerging trends which may impact the client's business. In some embodiments, the regulatory insights module 230 generates a trending topics interactive dashboard which may be provided to users or organizations (e.g., clients 110-118 of FIG. 1A) via the interface module 137 of FIG. 1A and the network 120 of FIG. 1A. The dashboard allows a user to customize views by applying specific filters. That is, the dashboard provided by the regulatory insights module 230 allows a user to filter alerts by date, geography, regulatory topics, and industries to streamline their regulatory search.

Based on data obtained by a regulatory intelligence controller 135 of FIG. 1A, the regulatory insights module 230 can generate the dashboard by determining trending regulatory topics for a given industry (e.g., food and beverage) for a given location (e.g., the United States) and a given timeframe (e.g., last 5 years). Once it determines the trending regulatory topics, the regulatory insights module 230 can further provide a topic breakdown by months, as well as a trend breakdown by region, country level, and provide insights on current trends by determining how many times one or more keywords are repeated in the plurality of websites and channels that were scanned by the regulatory insights module 230. Thus, an organization can access critical insights and graphs tailored to the organization's needs, and can view statistics on alert priorities, types, upcoming deadlines and more. The advanced analytics provided by the regulatory insights module 230 allows an organization to easily analyze data to uncover trends in alerts, stay on top of compliance deadlines, and track the progress of the organization's requests.

The expert module 240 is configured to provide a user or organization with on-demand access to regulatory expertise. Specifically, the expert module 240 enables a user or organization to instantly tap into a network of subject matter experts, so that the user or organization can connect with the ideal subject matter experts to deep dive into product compliance and craft a business strategy that aligns perfectly with today's regulations. The expert module 240 allows for a user or organization to quickly submit a regulatory request or question to one or more experts in just one click, saving time and streamlining the process. The expert module 240 generates a centralized request dashboard, which the user or organization can access, to view and manage all team members' requests. Through the expert module 240, a user or organization can collaborate easily with experts or team members directly through the request dashboard. Also, the expert module 240 provides real time notifications for any changes to a status of a user's regulatory request or new comments made by experts or team members in answer to the user's regulatory request. Further, the expert module 240 allows for the network of subject matter experts to verify the data of the AI model 210, including the training data of the AI model 210. Also, the subject matter experts can verify answers to regulatory queries, requests or questions, regardless of whether the proposed answers are generated or obtained by the AI model 210, an external LLM, or by regulatory documents that are accessible to the AI model 210.

The ontology classifier module 250 (which can comprise a reg-ontology classification as depicted in FIG. 1C) is tasked with automatically classifying regulatory data or documents by determining certain features, analyzing the regulatory data or documents, and then based on this information, classifying those regulatory data or documents into the most appropriate categories. The ontology classifier module 250 is configured to classify data or documents that have been uploaded by the user or organization to the server 130 or database 140 (FIG. 1A). The ontology classifier module 250 can also classify data or documents that have been obtained through a Web search or scraping of the AI model 210. The ontology classifier module 250 can classify also data or documents that have been furnished or generated by a third-party AI model or LLM through the GEN-AI agent 215. For instance, if a user prompts the third-party AI model or LLM to provide an answer to the regulatory question, the third party AI model or LLM may provide one or more regulatory content, data or documents to the user through the GEN-AI agent 215. Such regulatory content, data or documents that are furnished by the third-party AI model or LLM can be used as content to train the AI model 210 and/or the ontology classifier module 250.

In some embodiments, the ontology classifier module 250 will determine the meaning of a word or words of a regulatory document. Based on that meaning, the ontology classifier module 250 will then determine the most appropriate classification for that regulatory document. The ontology classifier module 250 may also determine what different industries are impacted by the regulatory document. The ontology classifier module 250 may further determine what regulatory topics are touched upon or covered by the regulatory document. In other words, the ontology classifier module 250 classifies or places a given regulatory document in a specific location of a given hierarchy of classifications, based on certain features that the ontology classifier module 250 determines. Those features determined by the ontology classifier module 250 include, but are not limited to, metadata associated with the regulatory content or document, source or web page associated with the regulatory content or document, one or more meanings of a word or set of words presented in the regulatory document, a determination of the specific industries that are impacted by the regulatory document, and the regulatory topics that are presented or highlighted by the regulatory document.

According to some embodiments of the present disclosure, when a regulatory document is updated and an organization is provided with an alert about the update through the regulatory alerts module 220, the updated regulatory document is also classified by the ontology classifier module 250 and this classification in turn connects the regulatory document or content to the user's request that triggered the alert. This in turn leads to content creation, predictive analytics and trends, as described earlier herein. In other words, an updated regulatory document can be mapped using the ontology classifier. Then, the system matches a client's scope to the ontology. Based on the matching, the system can automatically match applicable regulatory information to the client and provide insights and trends relevant to the applicable regulatory information. The system provides a deep analytics solution to provide to customers, by identifying emerging trends, repeated keywords, and recommending actions or tasks that the client can perform in order to comply with regulatory requirements.

FIG. 3 depicts five specialized agents or components of the GEN-AI agent 215. In some embodiments, these five specialized agents may be considered as submodules of the GEN-AI agent 215. The five specialized agents are tasked with specific duties. The first agent, an index evaluator 310, determines if a query from a customer or organization requires new data retrieval or if the query can be addressed through reformulation of existing data. The second agent, a document retriever 320, finds and retrieves the most relevant content from internal or external sources. The third agent, a document grader 330, evaluates and prioritizes retrieved documents, ensuring that only the most relevant data is used. For every assessment of the retrieved documents, the document grader 330 can run a Web search and verify that the retrieved documents are relevant and accurate and are not hallucinations. The fourth agent, a WebSearcher 340, sources supplementary information from the Web to enhance responses to regulatory inquiries, when internal data is insufficient. The fifth agent, an answer generator and grader 350, generates precise answers and verifies their alignment with the original query made by the customer or organization.

Figure 4:
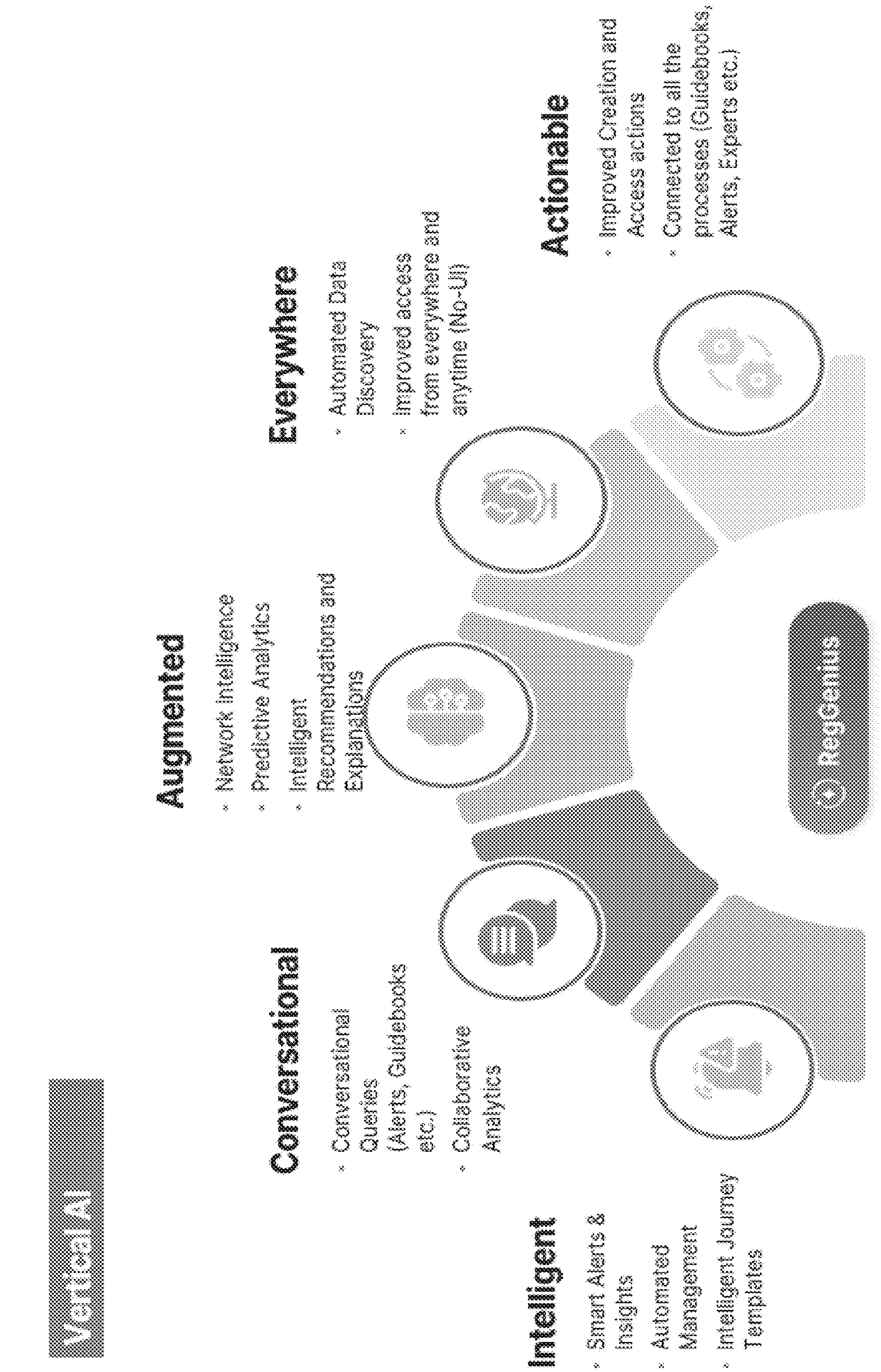
FIG. 4 depicts aspects of vertical artificial intelligence utilized by the systems and methods, in accordance with certain embodiments disclosed herein.

FIG. 4 depicts aspects of vertical artificial intelligence or industry specific AI, utilized by the systems and methods in accordance with certain embodiments disclosed herein. In some embodiments, the AI model 210 of FIG. 2 (which can be synonymous with RegGenius as shown in FIG. 4) utilizes vertical artificial intelligence to help in establishing the context of regulatory content that is retrieved and for enhancing system performance to meet the regulatory needs of the organization. Also, when the GEN-AI agent 215 of the AI model 210 is used, the vertical AI reduces the chances that the GEN-AI agent 215 will utilize or provide the hallucinations that are furnished by a third-party AI or LLM.

Specifically, as depicted in FIG. 4, the AI model 210 collaborates with the regulatory alerts module 220 and the regulatory insights module 230, and uses AI to provide intelligence in the smart alerts and insights that are provided by the regulatory alerts module 220 and the regulatory insights module 230, respectively. Also, the AI model 210, with its GEN-AI agent 215 collaborates with LLMs (whether it be third party LLMs or the specific organization's own LLM) uses AI to provide conversational artificial intelligence, so that a user may ask conversational regulatory queries, in order to obtain answers from the LLM in response to the conversational regulatory queries. Further, the AI model 210 uses vertical intelligence to augment its network intelligence and provide both predictive analytics and intelligent/smart actionable recommendations, as described earlier herein. Also, the artificial intelligence of the AI model 210 can be accessed everywhere and anywhere, at any time, and it can automate data discovery from both internal and external sources. Finally, the AI model 210 provides actionable workflows or next steps, by collaborating with the regulatory alerts module 220 as described earlier herein.

Figure 5:
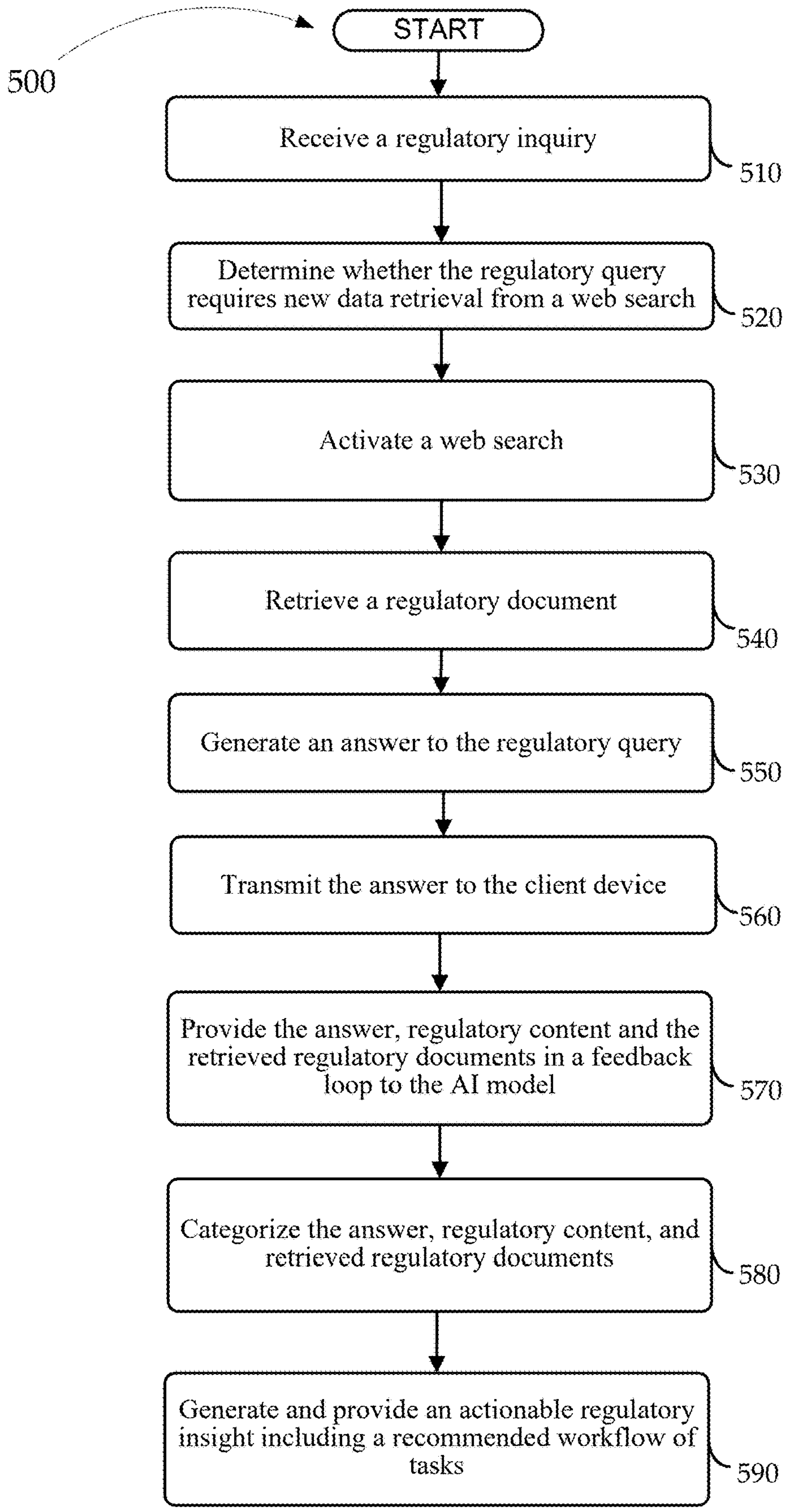
FIG. 5 is a flowchart of an example method of the present disclosure.

FIG. 5 is a flow diagram of an exemplary method 500 for generating actionable regulatory insights for predictive analytics. At step 510, a regulatory query or question is received, by the GEN-AI agent 215 of the AI model 210 (FIG. 2), from a network-enabled client computing device associated with a user or organization (such as clients 110-118 in FIG. 1A). In some embodiments, the GEN-AI agent 215 has agentic artificial intelligence and vertical artificial intelligence, as described earlier herein. Also, the GEN-AI agent 215 utilizes retrieval augmentation generation techniques. That is, the GEN-AI agent 215 can use third-party AI models or LLMs (such as ChatGPT) and search online for regulatory content or documents that answer the query, or the GEN-AI agent 215 can search only on the user or customer's data or documents and context. The regulatory question may be received via the interface module 137 (FIG. 1A). The regulatory query can include a question related to a regulation that is relevant to an industry of the organization. In some embodiments, the AI model 210 is preloaded with training data (preferably regulatory training data points) and a hierarchy of classifications. Also, as described earlier, the GEN-AI agent 215 can include an ontology classifier to categorize data in a classification within the hierarchy of classifications of the AI model 210. The data that can be categorized by the ontology classifier can include, but is not limited to, generated answers to the regulatory query, recommendations, regulatory content, regulatory documents, prompts to LLMs, online searches, search results, and the like.

At step 520, the GEN-AI agent 215 evaluates the question and determines if the query requires new data retrieval or if the query can be addressed by existing data or through reformulation of existing (internal) data. The existing data is presumably accessible to the GEN-AI agent 215. In some embodiments, the index evaluator 310 of the GEN-AI agent 215 performs this task. The existing data that is searched by the GEN-AI agent 215 can be existing internal data that is stored in the database 140 or the server 130, or it can be data that was uploaded by the user or organization and stored by the AI model 210 or data that is in the organization's private LLM coupled to the AI model 210. In some embodiments, the existing data that is searched by the GEN-AI agent 215 can be the training data of the AI model 210.

If the GEN-AI agent 215 determines that existing internal data can answer the query, the GEN-AI agent 215 will generate an answer to the query based on the existing internal data. A determination can be made whether the answer based on the existing internal data is relevant to the query. If so, then the answer is provided to the user through the GEN-AI agent 215.

At step 530, when the GEN-AI agent 215 determines that the regulatory query requires new data retrieval, the GEN-AI agent 215 activates a Web search. The Web search activation can comprise prompting an external large language model (LLM) to provide a regulatory document that answers the regulatory query. If the GEN-AI agent 215 determines there is a document that answers the query from existing internal data, the GEN-AI agent 215 will retrieve the document from the existing internal data. In some embodiments, the document retriever 320 of the GEN-AI agent 215 performs this task, by finding and retrieving the most relevant content from internal or external sources. Then, the retrieved document is graded and evaluated. A determination is made whether the retrieved document has regulatory relevance to the query. In some embodiments, the document grader 330 of the GEN-AI agent 215 performs this task, by evaluating and prioritizing retrieved regulatory documents, ensuring that only the most relevant data is used.

In some embodiments, if the retrieved document from existing internal data has regulatory relevance to the regulatory query, then the GEN-AI agent 215 will generate an answer based on the retrieved document. A determination is made whether the answer based on the retrieved document is relevant to the query. If so, then the answer is provided to the client computing device of the user through the GEN-AI agent 215.

If the retrieved document does not have regulatory relevance to the query, then the GEN-AI agent 215 will determine if a search of the Web for regulatory content is active. If a Web search is active, then the Web search continues and an answer to the query is generated based on the Web search. A determination is made whether the answer based on the Web search is relevant to the query. If so, then the answer is provided to the user through the GEN-AI agent 215. If, on the other hand, a Web search is not active, then the GEN-AI agent 215 will ask the user if the user wants the GEN-AI agent 215 to perform a web search online regarding the query, or if the user wants the GEN-AI agent 215 to only answer the query using the existing internal data (e.g., existing internal data that is stored in the database 140 or the server 130, training data of the AI model 210, data that was uploaded by the user or organization and stored by the AI model 210 or in the organization's private LLM that is coupled to the AI model 210).

As an optional step, the GEN-AI agent 215 will translate the retrieved document to the user's preferred language, if the retrieved document is in a different language than that of the user's preferred language If the user responds by requesting the GEN-AI agent 215 to perform a web search online regarding the query, the GEN-AI agent 215 will perform the web search. In some embodiments, the GEN-AI agent 215 will scrape the Web for regulatory content or documents that answer the regulatory query. In other embodiments, the GEN-AI agent 215 will generate a response to the regulatory query by retrieving regulatory data that answers the query. Such data that is retrieved may include data or regulatory documents that are provided by a third-party AI model or LLM (such as ChatGPT) in answer to the query. In some embodiments, the WebSearcher 340 of the GEN-AI agent 215 performs this task, by sourcing supplementary information from the Web to enhance responses to regulatory inquiries, when existing internal data is insufficient.

At step 540, a regulatory document is retrieved that answers the regulatory query. The regulatory document originates from at least one of the existing internal data and the external LLM.

At step 550, assuming that the GEN-AI agent 215 obtains a regulatory content or document that answers the query, or supplementary information from the Web to enhance responses to the regulatory inquiry, the GEN-AI agent 215 generates a precise answer to the regulatory query and verifies the alignment of the answer with the regulatory query. In some embodiments, the answer generator and grader 350 of the GEN-AI agent 215 performs this task.

The verification process is underpinned by the multi-tiered agentic AI framework of the system, which combines the capabilities of multiple AI agents, human oversight, and customer feedback for robust validation. The process unfolds as follows:

AI Agent 1—Primary Response Generation:

The first AI agent, using Model 1, generates recommendations or insights based on customer context. This includes parsing uploaded content, analyzing regulations, and producing initial outputs.

AI Agent 2—Outcome Validation:

A second AI agent, operating with Model 2, independently validates the output of AI Agent 1. It evaluates the accuracy, completeness, and contextual relevance of the initial insights using a distinct algorithm or dataset. Any discrepancies identified by AI Agent 2 trigger a re-evaluation process.

Human Oversight:

In some embodiments, outputs from both AI agents are then reviewed by a human expert, ensuring the responses are contextually aligned, accurate, and actionable. Human oversight also verifies nuances that may not be captured by AI models, such as the interpretation of ambiguous regulatory language.

Client Feedback Integration:

Customers can provide feedback on the recommendations or insights through the platform. This feedback is incorporated into a feedback loop to refine the performance of both AI agents, continuously improving accuracy and relevance over time.

This layered approach, combining AI-to-AI validation, human expertise, and client feedback, ensures a high level of precision, reliability, and adaptability. By leveraging this framework, the system provides unparalleled confidence in its outputs, aligning with the dynamic and complex nature of regulatory compliance.

Returning to FIG. 5, at step 560, the generated answer to the inquiry is provided to the client computing device. The generated answer may include regulatory content from the retrieved regulatory document and a reference or a web link to the retrieved regulatory document. The generated answer may also include a recommendation on how to optimally implement the regulatory content. The generated answer can indicate whether it was derived from the client's own data collection/private LLM, or if a web search was used to obtain the regulatory content.

At step 570, the answer, the regulatory content and the retrieved regulatory document are provided to the AI model 210 for training purposes in a feedback loop, so that the training data of the AI model may be improved using the data from answer, the regulatory content and the retrieved regulatory document. In other words, the answer, the regulatory content, and the retrieved regulatory document are fed into the AI model 210 in a feedback loop to improve the training data of the AI model.

At step 580, the generated answer, regulatory content, and the retrieved regulatory document are categorized by the ontology classifier into one or more classifications within the hierarchy of classifications of the AI model 210.

At step 590, the AI model 210 generates and provides the client with an actionable regulatory insight for predictive analytics. The actionable regulatory insight includes a recommended workflow of tasks based on the recommendation regarding the regulatory content that was provided in step 560.

One skilled in the art will appreciate that the method 500 is exemplary only, and that not all the steps of the method 500 are required for the method 500 to be performed successfully. Also, one skilled in the art can understand that the steps of the method 500 can be repeated or skipped.

Figure 6:
FIG. 6 is an example graphical user interface (GUI) generated by a generative artificial intelligence conversational module of the present disclosure.

FIG. 6 depicts an exemplary graphical user interface (GUI) 600 showing an interaction of a user or customer (labeled as "You") with a generative AI agent (labeled as "RegGenius"). In some embodiments, the generative AI agent is the GEN-AI agent 215 described earlier herein and depicted in FIGS. 2 and 3. As shown in the exemplary GUI 600, the user or customer asks the GEN-AI conversational agent a regulatory inquiry about registration requirements for food supplements in the UK, and also requests for links to references. In response, the GEN-AI conversational agent provides an answer in real time to the user or customer. When the GEN-AI conversational agent is processing data or generating the answer to the regulatory question, the GEN-AI conversational agent can display three flashing dots, indicating to the user or customer that it is formulating the answer to the regulatory question.

Figure 7:
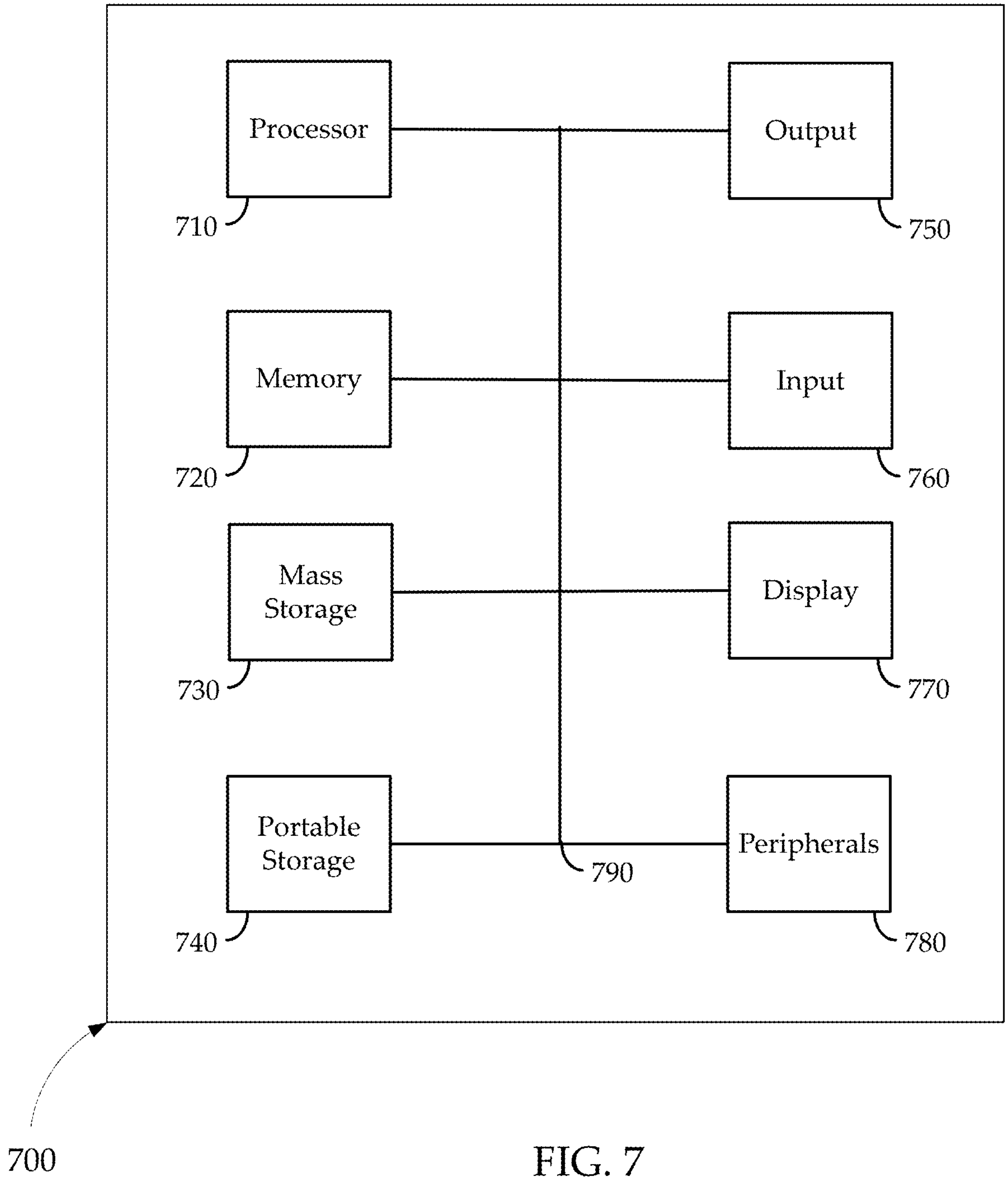
FIG. 7 is a simplified block diagram of a computing system, in accordance with some embodiments.

FIG. 7 is a block diagram of an exemplary computing device for implementing the methods described herein, in accordance with embodiments of the present invention. In some embodiments, the exemplary computing device of FIG. 7 can be used to implement portions of the clients 110-118 and the server 130 as shown in FIG. 1A.

The computer system 700 of FIG. 7 includes one or more processors 710 and main memory 720. The main memory 720 stores, in part, instructions and data for execution by the processor 710. The main memory 720 can store the executable code when in operation. The computer system 700 of FIG. 7 further includes a mass storage device 730, portable storage device 740, output devices 750, user input devices 760, a display system 770, and peripheral devices 780.

The components illustrated in FIG. 7 are depicted as being connected via a single bus 790. However, the components can be connected through one or more data transport means. For example, the processor 710 and the main memory 720 can be connected via a local microprocessor bus, and the mass storage device 730, peripheral device(s) 780, the portable storage device 740, and the display system 770 can be connected via one or more input/output (I/O) buses.

The mass storage device 730, which can be implemented with a magnetic disk drive or an optical disk drive, is a non-volatile storage device for storing data and instructions for use by the processor 710. The mass storage device 730 can store the system software for implementing embodiments of the present invention for purposes of loading that software into the main memory 720.

The portable storage device 740 operates in conjunction with a portable non-volatile storage medium, such as a floppy disk, compact disk or digital video disc, to input and output data and code to and from the computer system 700 of FIG. 7. The system software for implementing embodiments of the present invention can be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

The display system 770 may include a CRT, a liquid crystal display (LCD) or other suitable display device. Display system 770 receives textual and graphical information, and processes the information for output to the display device.

Peripheral device(s) 780 may include any type of computer support device to add additional functionality to the computer system. For example, peripheral device(s) 780 may include a modem or a router.

The components contained in the computer system 700 of FIG. 7 are those typically found in computer systems that can be suitable for use with embodiments of the present invention and are intended to represent a broad category of such computer components that are well known in the art. Thus, the computer system 700 of FIG. 7 can be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, heads-up display, wearable device, VR/AR headsets or equipment, hologram, digital billboard, watch, e-reader, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer can also include various bus configurations, networked platforms, multi-processor platforms, etc. Various operating systems can be implemented, including Unix, Linux, Windows, Macintosh OS, Palm OS, and other suitable operating systems. The exemplary machine may be in the form of a computer system 700, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

According to various embodiments, the computer system 700 may be preloaded with one or more regulatory documents or data. That is, for some exemplary embodiments of the present technology, the computer system 700 is preloaded with one or more documents prior to the computer system 700 conducting one or more methods described herein.

Instructions may further be transmitted or received over a network via the network interface device utilizing any one of a number of well-known transfer protocols (e.g., Hyper Text Transfer Protocol (HTTP)). While a machine-readable medium is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for the purpose of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A method for AI-powered document retrieval with hallucination prevention, the method comprising:

receiving, by a generative AI (GEN-AI) agent executing on one or more processors coupled to a memory of an artificial intelligence (AI) model, a regulatory query from a client computing device associated with an organization, the regulatory query comprising a question related to a regulation relevant to an industry of the organization, the GEN-AI agent comprising specialized components including an index evaluator, a document retriever, a document grader, a web searcher, and an answer generator;

determining, by the index evaluator, whether the regulatory query requires new data retrieval from a web search or whether existing internal data accessible to the AI model can answer the regulatory query;

when the new data retrieval is required, activating, by the web searcher, the web search utilizing an external large language model (LLM) to identify and retrieve a regulatory document that answers the regulatory query, the utilizing comprising transmitting a structured query request from the one or more processors to the external LLM via a network interface;

retrieving, by the document retriever, the regulatory document in answer to the regulatory query from at least one of the existing internal data or from the external LLM;

evaluating, by the document grader, the retrieved regulatory document for regulatory relevance to the regulatory query, the evaluating comprising:

(i) automatically cross-referencing the retrieved regulatory document against multiple independent online sources to confirm factual accuracy and identify inconsistencies indicative of hallucinated content, the cross-referencing comprising executing comparison algorithms stored in the memory to detect textual inconsistencies between the retrieved regulatory document and the multiple independent online sources, thereby computationally identifying hallucinated content through automated discrepancy detection and thereby improving accuracy of computer-generated regulatory responses; and (ii) running a supplemental web search to verify that the retrieved regulatory document is relevant and accurate and is not a hallucination;

generating, by the answer generator, a generated answer to the regulatory query based on the retrieved regulatory document, the generating comprising implementing a multi-tiered validation framework comprising:

(i) a first AI agent using a first model generating a candidate answer and producing a first output;

(ii) a second AI agent using a second model architecturally distinct from the first model independently validating the first output by performing parallel analysis of the retrieved regulatory document to produce a second output;

(iii) automatically comparing the first output and the second output to identify semantic discrepancies, the identification of semantic discrepancies exceeding a predetermined threshold stored in the memory indicating hallucinated content, the predetermined threshold comprising a numerical similarity score value and discrepancies exceeding the predetermined threshold triggering automated re-processing of the regulatory query, thereby reducing hallucinations in computer-generated regulatory answers through computational model disagreement analysis;

(iv) prompting the external LLM with follow-up verification questions to check veracity of the generated answer and reduce chances of hallucination by leveraging generative capabilities of the external LLM; and (v) utilizing a vertically-trained artificial intelligence model, specialized in the organization's specific regulatory domain, to establish context of the retrieved regulatory document and reduce chances that hallucinated content from the external LLM will be incorporated into the generated answer; and transmitting from the one or more processors to the client computing device via the network interface, the generated answer including regulatory content from the retrieved regulatory document and a reference to the retrieved regulatory document.

2. The method of claim 1, further comprising requesting the organization to verify whether the GEN-AI agent is to perform the web search online regarding the regulatory query or answer the regulatory query using only the existing internal data.

3. The method of claim 2, wherein the existing internal data comprises at least one of existing internal data stored in a database or a server associated with the AI model, data that is uploaded by the organization and stored by the AI model, data in the organization's private LLM that is accessible to the AI model, or training data of the AI model.

4. The method of claim 1, further comprising evaluating and grading the retrieved regulatory document.

5. The method of claim 1, wherein the generated answer includes an indication whether it was derived from the organization's own data collection, from the organization's private LLM, or from a search online.

6. The method of claim 1, wherein activating the web search further includes sourcing supplementary information from the Web to enhance an answer to the regulatory query, when the existing internal data is insufficient.

7. The method of claim 1, further comprising:

prompting the external large language model (LLM) to provide a plurality of recommended tasks to be implemented for regulatory compliance based on the regulatory document;

requesting the external large language model (LLM) to test its plurality of recommended tasks in parallel tests; based on outcomes of the parallel tests, based on outcomes of the parallel tests, asking the external large language model (LLM) to prioritize its plurality of recommended tasks in order based on optimization; and obtaining the plurality of recommended tasks and prioritization from the external large language model (LLM).

8. A system for AI-powered document retrieval with hallucination prevention, the system comprising:

one or more processors;

a memory coupled to the one or more processors;

a network interface coupled to the one or more processors and to a network, the network interface configured to communicate with at least one client computing device via the network; and a generative AI (GEN-AI) agent executing on the one or more processors and communicatively coupled to the memory and the network interface, the GEN-AI agent comprising specialized components including an index evaluator, a document retriever, a document grader, a web searcher, and an answer generator;

the one or more processors being configured to execute instructions stored in the memory to:

receive, by the GEN-AI agent, a regulatory query from a client computing device associated with an organization, the regulatory query comprising a question related to a regulation relevant to an industry of the organization;

determine, by the index evaluator, whether the regulatory query requires new data retrieval from a web search or whether existing internal data accessible to an artificial intelligence (AI) model can answer the regulatory query;

when the new data retrieval is required, activate, by the web searcher, the web search utilizing an external large language model (LLM) to identify and retrieve a regulatory document that answers the regulatory query, the utilizing comprising transmitting a structured query request from the one or more processors to the external LLM via the network interface;

retrieve, by the document retriever, the regulatory document in answer to the regulatory query from at least one of the existing internal data or from the external LLM;

evaluate, by the document grader, the retrieved regulatory document for regulatory relevance to the regulatory query, the evaluating comprising:

(i) automatically cross-referencing the retrieved regulatory document against multiple independent online sources to confirm factual accuracy and identify inconsistencies indicative of hallucinated content, the cross-referencing comprising executing comparison algorithms stored in the memory to detect textual inconsistencies between the retrieved regulatory document and the multiple independent online sources, to computationally identify hallucinated content through automated discrepancy detection and improve accuracy of computer-generated regulatory responses; and (ii) running a supplemental web search to verify that the retrieved regulatory document is relevant and accurate and is not a hallucination;

generate, by the answer generator, a generated answer to the regulatory query based on the retrieved regulatory document, the generating comprising implementing a multi-tiered validation framework comprising:

(i) a first AI agent using a first model, to generate a candidate answer and produce a first output;

(ii) a second AI agent using a second model architecturally distinct from the first model, to independently validate the first output by performing parallel analysis of the retrieved regulatory document to produce a second output;

(iii) automatically comparing the first output and the second output to identify semantic discrepancies, the identification of semantic discrepancies exceeding a predetermined threshold stored in the memory indicating hallucinated content, the predetermined threshold comprising a numerical similarity score value and discrepancies exceeding the predetermined threshold triggering automated re-processing of the regulatory query, to reduce hallucinations in computer-generated regulatory answers through computational model disagreement analysis;

(iv) prompting the external LLM with follow-up verification questions to check veracity of the generated answer and reduce chances of hallucination by leveraging generative capabilities of the external LLM; and (v) utilizing vertical artificial intelligence to establish context of the retrieved regulatory document and reduce chances that hallucinated content from the external LLM will be incorporated into the generated answer; and transmit, from the one or more processors to the client computing device via the network interface, the generated answer including regulatory content from the retrieved regulatory document, and a reference to the retrieved regulatory document.

9. The system of claim 8, wherein the one or more processors are further configured to evaluate and grade the retrieved regulatory document.

10. The system of claim 8, wherein the one or more processors are further configured to request the organization to verify whether the GEN-AI agent is to perform the web search online regarding the regulatory query or answer the regulatory query using only the existing internal data.

11. The system of claim 8, wherein the generated answer includes an indication whether it was derived from the organization's own data collection, from the organization's private LLM, or from a search online.

12. The system of claim 8, wherein activating the web search further includes sourcing supplementary information from the Web to enhance an answer to the regulatory query, when the existing internal data is insufficient.

13. The system of claim 8, wherein the one or more processors are further configured to:

prompt the external large language model (LLM) to provide a plurality of recommended tasks to be implemented for regulatory compliance based on the regulatory document;

request the external large language model (LLM) to test its plurality of recommended tasks in parallel tests, based on outcomes of the parallel tests;

based on outcomes of the parallel tests, ask the external large language model (LLM) to prioritize its plurality of recommended tasks in order based on optimization; and obtain the plurality of recommended tasks and prioritization from the external large language model (LLM).

* * * * *